Sept. 1, 1964
J. B. LONG
3,146,878
EXTENSIBLE BELT CONVEYOR SYSTEM
Filed Aug. 27, 1962
3 Sheets-Sheet 1
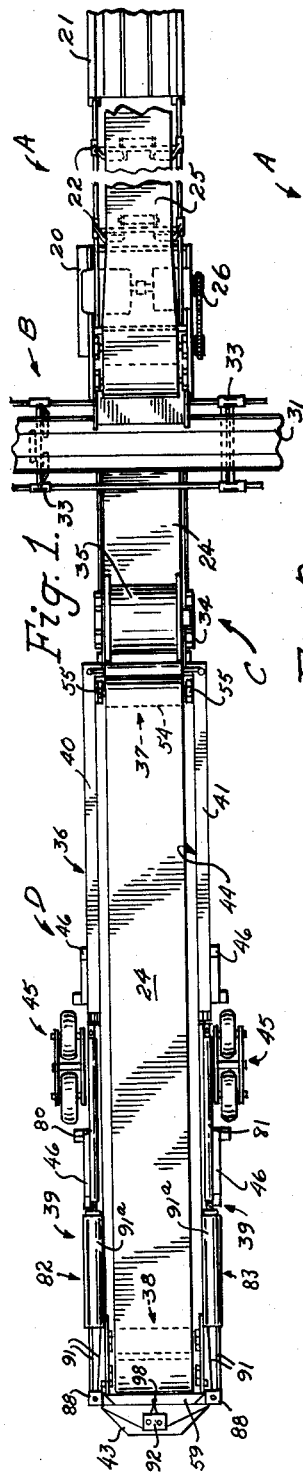
INVENTOR
JOHN B. LONG
BY
ATTORNEYS

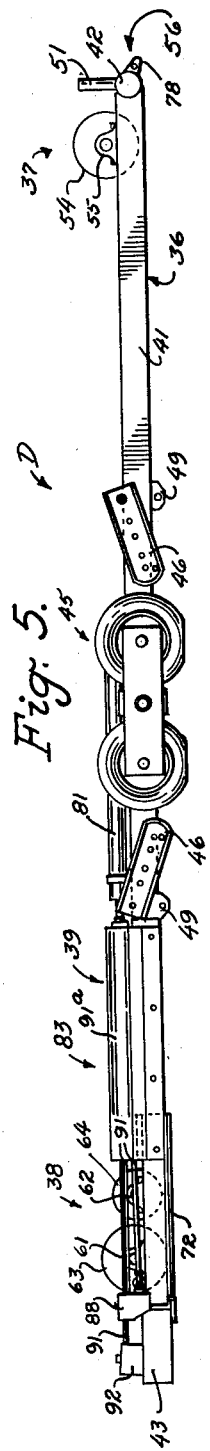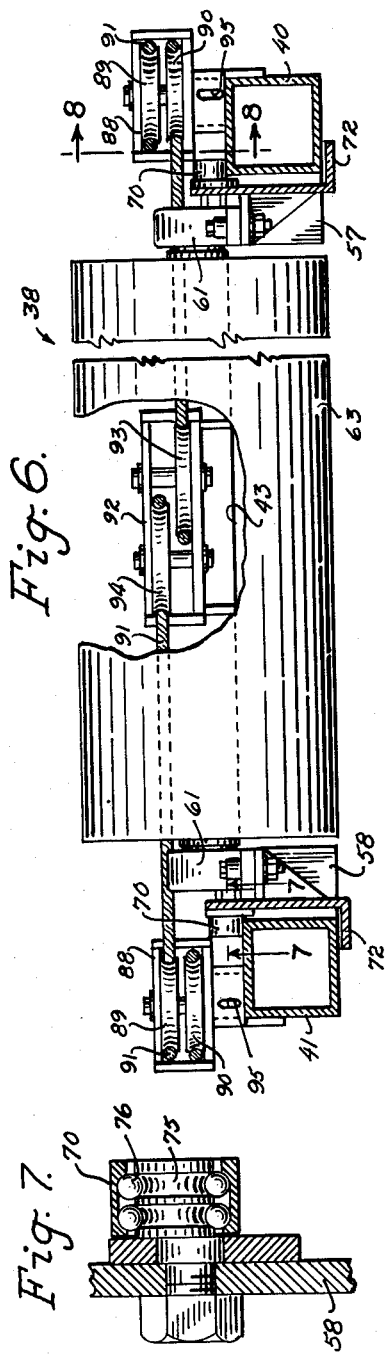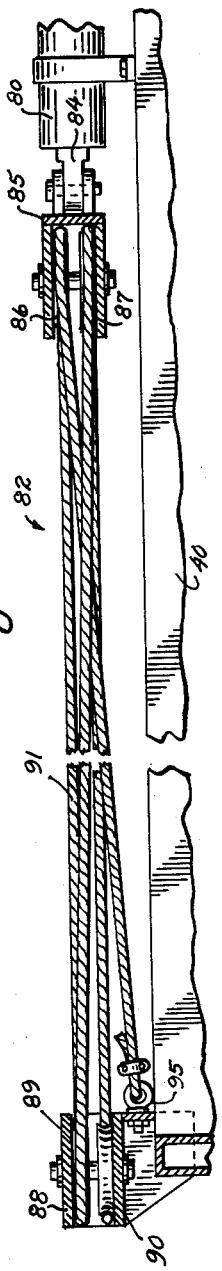

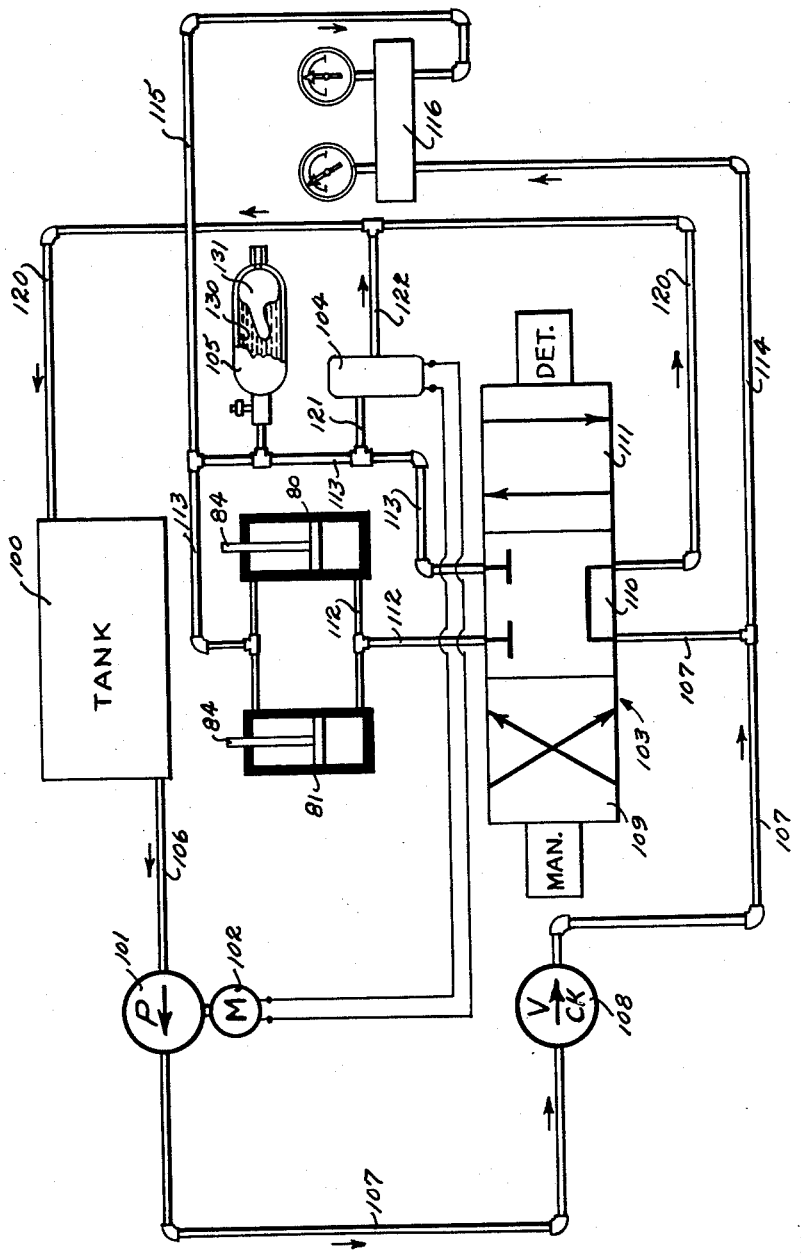

United States Patent Office 3,146,878
Patented Sept. 1, 1964

3,146,878
EXTENSIBLE BELT CONVEYOR SYSTEM
John B. Long, Oak Hill, W. Va., assignor to Marmon-Herrington Company, Inc., Indianapolis, Ind., a corporation of Indiana
Filed Aug. 27, 1962, Ser. No. 219,544
5 Claims. (Cl. 198—139)

This invention relates to improvements in conveyor systems which embody conveying techniques involving variation in the active conveying reach while the conveyor is in operation. Such conveyors are known in the trade as extensible conveyors, and are so designated in this disclosure.

Extensible conveyor systems, such as that of the present invention are particularly valuable in continuous mining operations in which a "continuous miner" is advanced and retracted to different mining positions and a conveyor is provided for receiving the material discharged from the "continuous miner." Such a conveyor must inherently embody structural features enabling variation in the active conveying reach thereof complementary to the movement of the "continuous miner." In conveyors of the belt type, such as that disclosed herein, the structural feature which enables the active conveying reach thereof to be extended, retracted, or maintained at a given length, is known as a belt storage unit.

In previously provided extensible belt conveyor systems the belt storage unit has been situated intermediate the head section and tail section of the conveyor. The active conveying reach of the belt likewise extends from the tail section to the head section. Thus at the start of any conveying operation using this arrangement, a straight path of considerable length must be provided to one side of the discharge point of the head section so that the tail section, belt storage unit, and head section may be aligned in that order, in a substantially straight line. In mining operations, for instance where it is desirable to mine a lateral entry at right angles from the main entry, space will be initially at a premium, so that it is difficult to linearly align a tail section, belt storage unit and head section, in that order, to one side of the main line conveyor. On the other hand, a breakthrough opposite the direction of the proposed lateral entry is usually open and available. The primary object of my invention is therefore the provision of an extensible belt conveyor system wherein the belt storage unit is disposed to the opposite side of one of the end sections from the other end section. By this arrangement I can provide an extensible belt conveyor system wherein the head section and tail section may be disposed to one side of a main line conveyor and the belt-storage unit disposed to the other side thereof, eliminating the space requirement for the belt storage unit between the head section and the tail section.

In previously provided belt storage apparatus, in which the same is located intermediate the head section and tail section of the conveyor, the belt storage unit must support the active conveying reach of the belt at a sufficient height to provide space therebeneath for the various mechanism necessary for the feeding, retraction, and storage of a predetermined portion of the belt. As a matter of fact, the required height for such previously provided belt storage apparatus has been such as to make them unacceptable for use in low ceiling mines. It is therefore a further object of my invention to provide an extensible belt conveyor system wherein the belt storage unit is positioned to one end of the active conveying reach thereof so that the belt storage unit is not required to support the active conveying reach of the belt. This arrangement permits use of a belt storage unit of low height, the same having actually been constructed and used in instances where the entry height at the belt storage unit location is less than thirty inches.

A further object is the provision of an extensible belt conveyor system wherein the belt storage unit thereof is disposed to the opposite side of one of the end sections from the extension therefrom of the active conveying reach of the belt so that the belt storage unit may be located at a point away from any spillage from the active conveying reach and, inasmuch as the various mechanism of the belt storage unit is not located immediately adjacent the active conveying reach, the operation thereof will not tend to interfere with the active conveying reach in such a manner as to cause the spillage of material therefrom.

A further object is the provision of an extensible belt conveyor system having a belt storage unit positioned at one end thereof, so that the conveyor system may be readily adapted to use either with or without the belt storage unit, the storage unit being positioned for addition or removal without affecting the other elements of the conveyor system. This is important from both the manufacturer's viewpoint and the user's viewpoint, inasmuch as the head sections, tail sections, and intermedial parts of the conveyor may be sold as standard units, with or without the belt storage unit, and the belt storage unit can be sold or purchased later as the installation is progressively developed.

FIG. 1 is a top plan view of my improved extensible belt conveyor system.

FIG. 2 is a side view of the extensible belt conveyor system of FIG. 1.

FIG. 3 is a diagrammatic view of my improved extensible belt conveyor system.

FIG. 4 is a top plan view of the belt storage unit of my improved extensible belt conveyor system.

FIG. 5 is a side plan view of the belt storage unit of FIG. 4.

FIG. 6 is an enlarged sectional view taken substantially on the line 6—6 of FIG. 4.

FIG. 7 is an enlarged sectional view taken substantially on the line 7—7 of FIG. 6.

FIG. 8 is an enlarged sectional view taken substantially on the line 8—8 of FIG. 6.

FIG. 9 is a diagrammatic view of the hydraulic system of the belt storage unit of my improved extensible conveyor system.

In the drawings, wherein for the purpose of illustration is shown a preferred embodiment of the invention, and wherein similar reference characters designate corresponding parts throughout the several views, the letter A may generally designate a belt conveyor set-up; B a receiving conveyor; C belt handling apparatus for the insertion and removal of additional lengths of belting; and D belt storage means.

The endless belt conveyor set-up A may be of any conventional type, usually including a head section 20, tail section 21, and a plurality of intermedial belt supporting units 22 which orbitally support a belt 24, the active conveying reach 25 of the belt 24 extending from the head section 20 to the tail section 21.

In this conventional conveyor set-up, the head section 20 usually includes a drive means 26 for movement of the belt 24. The head section 20 is usually disposed adjacent a receiving conveyor B for the discharge of materials from the active conveying reach 25 onto the receiving conveyor B and the tail section 21 usually connected to some tram means such as a "continuous miner," which discharges a load onto the active conveying reach 25 of the belt 24 at the tail section 21. The head section 20 is usually maintained in a fixed position adjacent the receiving belt B, and when this set-up is used in an extensible conveyor system, the tail section is advanced and retracted in accordance with the movement of the equipment which discharges a load thereonto.

In my improved extensible belt conveyor system, referring to FIG. 3, the belt 24 orbitally extends from the tail section 21, about the head section 20, thence beneath the receiving belt conveyor B, through the belt storage means D and back to the tail section 21, the active conveying reach 25 thereof extending from the tail section 21 to the head section 20.

In this system it will be seen that the belt storage unit is located at a point remote from the active conveying reach 25 and is not intermediate the head section 20 and tail section 21 as in previously provided extensible conveyor systems. This permits retraction of the tail section 21 to a position immediately adjacent the head section 20. As shown, the endless belt conveyor set-up A may be positioned to one side of the receiving conveyor B, the head section 20 of which may include a hold-down roller 30 for maintaining the belt 24 in position to move beneath the receiving conveyor B. This elimination of structure intermediate the head section and tail section, and the positioning of the conveyor set-up A all to one side of the receiving belt B with the belt storage means D at the opposite side of the receiving conveyor B, permits setting up of the extensible conveyor system in a confined space, such as at the initial stage of the mining of lateral entries at right angles from the main entry which was previously described.

The receiving conveyor B may be of any conventional construction, the same herein being shown as a belt conveyor including an upper reach 31 and a lower reach 32 operably mounted on supports 33.

The belt handling apparatus C may likewise be of any conventional type. Such belt handling apparatus usually includes a frame 34 for supporting a roll of belting 35 in juxtaposition for facile addition and removal of sections of belting. The belt handling apparatus might, for instance, be of the type shown and disclosed in Patent No. 2,933,177, dated April 19, 1960, of which I am the patentee. The belt handling apparatus is preferably disposed at the most accessible position of the conveyor, usually adjacent the receiving conveyor B. In this manner, additional rolls of belting may be conveyed along the receiving conveyor B to adjacent the belt handling apparatus, where it will be inserted in the conveyor. Such belt handling apparatus C may be independently supported or it may be secured to the belt storage means D, as I have shown in FIGS. 1 and 2. When the belt handling apparatus C is interconnected to the belt storage means D, an integral unit is provided whereby extensibility of the existing belting and addition of further belting may be taken care of at a single location.

Belt storage means D preferably includes a frame 36, fixed pulley means 37, movable pulley means 38, and means 39 for controlling movement of pulley means 38.

The frame 36 preferably includes a pair of spaced apart elongated side frame members 40 and 41, a rear cross brace member 42, and a front cross brace member 43. The members 40, 41, 42 and 43 are interconnected to each other in juxtaposition to provide an elongated skeletal framework defining a slotway 44 through which the pulley means 38 moves and through which the belting 24 moves in a plurality of pathways.

A wheel assembly 45 is preferably mounted upon each side frame members 40 and 41, intermediate the cross brace members 42 and 43, providing a balanced mobile unit which may be easily moved from one position to another.

Mounted upon each side frame member 40 and 41, preferably adjacent each wheel assembly 45 thereof may be supporting jack members 46. These supporting jack members 46 are preferably hingedly supported upon the frame 36 so that they may be pivotally raised and supported upon bracket members 47 when the belt storage means D is being moved, and when the belt storage means D is arranged in the extensible conveyor system the jacks 46 will be lowered and interconnected to the brackets 49, supporting the belt storage means D in a fixed position. The jack members 46 to opposed sides of the frame 36 may have their lower ends interconnected by a cross brace 50 for maintaining relative positioning between the opposed jack members.

A vertically extending support member 51 may be provided adjacent one end of the storage means D, for attachment thereto of the belt handling apparatus C.

Fixed pulley means 37 preferably includes a pulley 54 rotatably mounted upon pillow blocks 55. The pulley 54 extends axially intermediate the side frame members 40 and 41 within the slotway 44, and adjacent the belt receiving end 56 of belt storage means D.

Movable pulley means 38 preferably includes spaced apart side frame members 57 and 58 and cross frame member 59. The members 57, 58 and 59 are interconnected to provide a carriage framework which is slidable along frame 36 within the slotway 44. Mounted upon each side member 57 and 58 are a pair of spaced apart pillow blocks 61 and 62, the opposed pillow blocks 61 supporting a pulley 63 and the opposed pillow blocks 62 supporting a pulley 64.

The side frame members 40 and 41 provide a trackway for guiding the movement of the carriage framework of pulley means 38. Mounted upon each side frame 57 and 58 are roller means 70 which engage and are guided along the trackway provided by the side frame members 40 and 41. The side members 57 and 58 may each be provided with flanges 72 which extend beneath their respective adjacent side member 40 or 41. Flanges 72 prevent the carriage framework of pulley means 38 from being dislodged from engagement with the frame 36 and retain each roller means 70 in rotating abutment with the trackway provided by the side frame members 40 and 41.

As shown in FIG. 7, each of these roller means 70 are preferably interconnected to a respective side member 57 or 58 by means of a stepped shaft assembly 75 and are rotatably supported thereupon by the roller bearings 76.

The movable pulley means 38 is thereby free to move substantially the entire length of slotway 44, from adjacent cross member 43 to adjacent the fixed pulley 54.

As to the relationship of the various pulleys 54, 63 and 64 of the belt storage means D, pulley 63 is of largest diameter, pulley 54 of somewhat smaller diameter than pulley 63, and pulley 64 of somewhat smaller diameter than pulley 54. These pulleys are arranged in juxtaposition to define belt pathways whereby the upper reach of belting received beneath the receiving conveyor B will be first entrained about pulley 64, thence about pulley 54, and thence about pulley 63, the return reach of the belt extending from pulley 63 to tail section 21. A hold-down roller 78 may be mounted adjacent the end 56 of belt storage means D for positioning the upper reach of the belting being fed into the belt storage means D. The relationship of these pulleys likewise permits ingress and egress of belting to the belt storage means D at a point spaced below the pathways of belting, and likewise provides for the introduction and exit of the belting to and from the belt storage means D at the end 56 thereof.

The means 39 for controlling movement of the pulley means 38 preferably includes a pair of hydraulic cylinders 80 and 81 and cable assemblages 82 and 83. Hydraulic cylinders 80 and 81 are respectively mounted on side frame members 40 and 41, each of them including a shaft 84.

Cable assemblages 82 and 83 are respectively provided for cooperation with the hydraulic cylinders 80 and 81. Each cable assemblage includes a frame 85 which is attached to and supports sheaves 86 and 87 on shaft 84; a frame 88 mounted on frame 36 which supports sheaves 89 and 90; and a cable 91. A cover 91ª may be provided along the path of movement of frame 85. Mounted upon the cross piece 43 is a frame 92, which supports rotatable sheaves 93 and 94, one of each of which cooperates with a cable assemblage, as will be subsequently described.

The cable assemblages 82 and 83 differ only in the entrainment of cable therebout. In the cable assemblage 82, one end of cable 91 is secured to the eye 95 of frame 88, the cable extending from the eye 95, about sheave 86, thence about sheave 89, thence about sheave 87, thence about sheave 90, and thence about sheave 93 to interconnection with eye bolt 98 provided on the cross member 59 of the movable pulley means 38.

In the cable assemblage 83, the cable 91 thereof extends from eye bolt 95, about sheave 87, thence about sheave 90, thence about sheave 86, thence about sheave 89, and thence about sheave 94 to interconnection with eye bolt 98. By this arrangement it will be seen that the cable assemblages 82 and 83 multiply the extension of cable with respect to the stroke of the hydraulic cylinders 80 and 81 so that the movable pulley 38 moves four times the distance of movement of the shaft 84 of the hydraulic cylinders 80 and 81. For instance cylinders having a stroke of 60 inches will control movement of pulley means 38 through a distance of 18 feet 8 inches.

As shown in FIG. 9, the hydraulic system for the control of cylinders 80 and 81 preferably includes a tank 100, pump 101 driven by an electric motor 102, a four-way manual detent valve 103, a pressure switch 104, and an accumulator 105. A conduit 106 supplies fluid from the tank 100 to pump 101, a conduit 107 leading from pump 101 to valve 103. A check valve 108 is provided in the conduit 107 for a purpose which will be subsequently described. The valve 103 is movable through three positions, 109, 110 and 111, as diagrammatically illustrated in conventional J.I.C. symbols. One end of each of the hydraulic cylinders 80 and 81 is interconnected to the valve 103 by conduit 112, the other end of each of the hydraulic cylinders 80 and 81 being interconnected to the valve 103 by conduit 113.

A conduit 114 may be attached to conduit 107 and a conduit 115 attached to conduit 113, which conduits 114 and 115 lead to a pressure gauge 116. The pressure gauge 116 serves to measure the pressure on opposed sides of the valve 103. A conduit 120 is provided leading from the valve 103 to the tank 100. A conduit 121 leads from conduit 113 to pressure switch 104 and a conduit 122 leads from pressure switch 104 to conduit 120. The pressure switch 104 is of conventional construction whereby when the pressure in line 113 reaches a predetermined minimum contacts in the pressure switch 104 will be closed and the electric motor 102 will be activated, driving the pump 101, thereby pumping additional hydraulic fluid into the system whereby to maintain the pressure above a predetermined minimum. Likewise, when the pressure in conduit 113 reaches a predetermined maximum, the pressure switch 104 will be activated, cutting off electric motor 102 and stopping the pumping operation.

The accumulator 105 is interconnected to conduit 113. This accumulator 105 is a conventional bag type accumulator having a chamber 130 which receives hydraulic fluid and the bag-like member 131 within the chamber 130. The member 130 is usually charged with dry nitrogen at a predetermined pressure. I have found that a charging of fifteen hundred p.s.i. is desirable for operation in my hydraulic system. In the pumping of hydraulic fluid through conduit 113 under pressure, the fluid will flow into chamber 130, the pressure of the fluid compressing the bag-like member 131. Compression of the bag-like member naturally increases the pressure of the gas within the bag-like member 131 so that when pumping of fluid under pressure stops the gases in member 131 will have a tendency to expand, which expansion will force the ejection of fluid from within the chamber 130. The forcing of fluid from accumulator 105 into conduit 113 assures the maintenance of pressure in conduit 113. Check valve 108 is provided so that the hydraulic fluid retained under pressure in the accumulator will not run back through the vave 108 and overpower the pump 101 when the electric motor 102 is off.

When the belt storage means D is not being operated, the valve 103 will be in position 110. When it is desired to maintain the belting under tension, as will be normal in the usual running of the conveyor system, the valve 103 will be moved to position 109, in which position hydraulic fluid is pumped into the cylinders 80 and 81 through conduit 113, exerting pressure in a direction which tends to cause a retraction of the same, pulling the movable pulley means 38 away from the fixed pulley 54, thereby maintaining tension upon the belting 24. Due to the fact that the conveyor system is hydraulically controlled, it is to be noted that when the valve 103 is in this position the belting can be pulled from the belt storage means D under tension. When it is desired to release the tension on the belting, the valve 103 is moved to position 111.

In the operation of my improved extensible conveyor system the head section and tail section are moved into the desired conveying relationship, the same usually being aligned for linear extension of the active conveying reach of the belt from the tail section 21 to the head section 20. The belt storage means D is then moved into position, the same being linearly aligned with the desired linear extension of the active conveying reach of the belt. Belting is then supplied, such as by the belt handling apparatus C, and the belt orbitally entrained about the head section 20, tail section 21, and belt storage means D. The desired tension on the belting is secured by activation of the hydraulic system of the belt storage means D, and the drive means of the head section 20 is activated, thereby orbitally moving the endless belt 24.

This positioning of the belt storage means D for linear orbital movement of the belting throughout the conveyor system eliminates any turning or twisting of the belt, which materially lengthens the lift thereof. Insofar as the term linear is used in this specification and the claims appended hereto, it is deemed to cover a substantially straight line extension, including minor variations such as a horizontal shifting of the belt, such as may result from belt misalignment, and vertical displacement of the belt, such as sagging under load.

Various changes in the shape, size and arrangement of parts may be made to the form of the invention herein shown and described without departing from the spirit of the invention or the scope of the following claims.

I claim:

1. In an extensible belt conveyor system adapted to be extended as the means for applying a load to the conveyor is advanced, the combination of a head section; a tail section spaced apart from and to one side of said head section; belt storage means; an endless belt orbitally entrained about and extending between said sections and said belt storage means with the active conveying reach of said belt extending from said head section to said tail section; said head section being stationary in a predetermined position for unloading of the conveying reach of said belt; said tail section being movable with respect to said head section, in accordance with the movement of the unit applying a load to said belt; and said belt storage means being disposed in a spaced apart position from and to the opposite side of said head section from said tail section, said belt storage means including means for storing a substantial portion of said belt as said tail section is moved toward said head section and for paying out the stored portion of said belt as said tail section is moved away from said head section whereby the effective length of the conveying reach of said belt may be extended and retracted while the belt is running and while material is being conveyed, said last mentioned means including at least a pair of pulley means having said belt orbitally entrained thereabout and juxtaposed with respect to each other for relative movement together in extending said belt and in relative movement apart in retracting said belt, and a hydraulic system interconnected with said pulley means for controlling relative movement of said pulley means, said hydraulic system including valve means for controlling the same, said valve means having a plurality of control positions and being movable to a first control position for maintaining said hydraulic system in situ for substantially locking said pulley means at a given relative position, movable to a second control position for operation of said hydraulic system in urging relative movement apart of said pulley means, and movable to a third control position for operation of said hydraulic system in urging relative movement together of said pulley means.

2. In an extensible belt conveyor system the combination of a head section; a tail section; belt storage means; said head section, tail section and belt storage means being aligned for the orbital linear movement of a belt thereabout; said belt storage means being disposed to the side of one said section opposite the other said section, said other said section being lineally movable toward and away from said one said section; and said belt storage means includes means for storing a substantial portion of belting as said movable section is moved toward the other section and for paying out the stored portion of belting as said movable section is moved away from the other section whereby the effective length of the conveying reach of the belt may be extended and retracted while the belt is running and while material is being conveyed, said last mentioned means including at least a pair of pulley means having said belt orbitally entrained thereabout and juxtaposed with respect to each other for relative movement together in extending said belt and in relative movement apart in retracting said belt, and a hydraulic system interconnected with said pulley means for controlling relative movement of said pulley means, said hydraulic system including valve means for controlling the same, said valve means having a plurality of control positions and being movable to a first control position for maintaining said hydraulic system in situ for substantially locking said pulley means at a given relative position, movable to a second control position for operation of said hydraulic system in urging relative movement apart of said pulley means, and movable to a third control position for operation of said hydraulic system in urging relative movement together of said pulley means.

3. In an extensible belt conveying system the combination of a head section; a tail section; a belt storage means; one of said sections being movable with respect to the other; an endless belt orbitally entrained about and extending between said sections and said belt storage means; the active conveying reach of said belt extending from said head section to said tail section; said belt storage means being disposed to the opposite side of one of said sections from the extension therefrom of the active conveying reach of said endless belt; and said belt storage means includes means for storing a substantial portion of said belt as said movable section is moved toward the other section and for paying out the stored portion of said belt as said movable section is moved away from the other section whereby the effective length of the conveying reach of said belt may be extended and retracted while the belt is running and while the material is being conveyed, said last mentioned means including at least a pair of pulley means having said belt orbitally entrained thereabout and juxtaposed with respect to each other for relative movement together in extending said belt and in relative movement apart in retracting said belt, and a hydraulic system interconnected with said pulley means for controlling relative movement of said pulley means, said hydraulic system including valve means for controlling the same, said valve means having a plurality of control positions and being movable to a first control position for maintaining said hydraulic system in situ for substantially locking said pulley means at a given relative position, movable to a second control position for operation of said hydraulic system in urging relative movement apart of said pulley means, and movable to a third control position for operation of said hydraulic system in urging relative movement together of said pulley means.

4. In an extensible belt conveyor system the combination of a head section; a tail section; belt storage means; an endless belt orbitally entrained about said head section, tail section and belt storage means, the active conveying reach of said belt extending between said head section and said tail section; said head section being disposed intermediate said tail section and said belt storage means and including means for the discharge of material from the active conveying reach of said belt prior to normal engagement of said belt with said belt storage means; said tail section being movable with respect to said head section; and said belt storage means includes means for storing a substantial portion of said belt as said tail section is moved toward said head section and for paying out the stored portion of said belt as said tail section is moved away from said head section whereby the effective length of the conveying reach of said belt may be extended and retracted while the belt is running and while material is being conveyed, said last mentioned means including at least a pair of pulley means having said belt orbitally entrained thereabout and juxtaposed with respect to each other for relative movement together in extending said belt and in relative movement apart in retracting said belt, and a hydraulic system interconnected with said pulley means for controlling relative movement of said pulley means, said hydraulic system including valve means for controlling the same, said valve means having a plurality of control positions and being movable to a first control position for maintaining said hydraulic system in situ for substantially locking said pulley means at a given relative position, movable to a second control position for operation of said hydraulic system in urging relative movement apart of said pulley means, and movable to a third control position for operation of said hydraulic system in urging relative movement together of said pulley means.

5. In an extensible belt conveyor system the combination of a head section; a tail section; one of said sections being movable with respect to the other; belt storage means; an endless belt orbitally entrained about and extending between said sections and said belt storage means, the active conveying reach of said belt extending from said head section to said tail section; said belt storage means being disposed to the opposite side of one of said sections from the extension therefrom of the active conveying reach of said endless belt; and said belt storage means includes means for storing a substantial portion of said belt as said movable section is moved toward the other section and for paying out the stored portion of said belt as said movable section is moved away from the other section whereby the effective length of the conveying reach of said belt may be extended and retracted while the belt is running and while material is being conveyed, said last mentioned means including at least a pair of pulley means having said belt orbitally entrained thereabout and juxtaposed with respect to each other for relative movement together in extending said belt and in relative movement apart in retracting said belt, and a hydraulic system interconnected with said pulley means for controlling relative movement of said pulley means, said hydraulic system including valve means for controlling the same, said valve means having a plurality of control positions and being movable to a first control position for maintaining said hydraulic system in situ for substantially locking said pulley means at a given relative position, movable to a second control position for operation of said hydraulic system in urging relative movement apart of said pulley means, and movable to a third control position for operation of said hydraulic system in urging relative movement together of said pulley means, said pulley means comprising belt guiding and reversing means about which the stored portion of said belt extends in a plurality of loops whereby said belt may be extended, retracted and stored in said belt storage means in linear alignment with the belt extending between said sections.

References Cited in the file of this patent

UNITED STATES PATENTS

| | | |
|---|---|---|
| 1,748,301 | McKinlay | Feb. 25, 1930 |
| 2,753,981 | Madeira | July 10, 1956 |
| 2,933,177 | Long | Apr. 19, 1960 |
| 2,986,267 | Carlson | May 30, 1961 |

FOREIGN PATENTS

| | | |
|---|---|---|
| 767,930 | Great Britain | Feb. 13, 1957 |